United States Patent
Brahler, II

(10) Patent No.: US 7,267,155 B2
(45) Date of Patent: Sep. 11, 2007

(54) TIRE WORKING TOOL

(76) Inventor: Richard W. Brahler, II, 1152 W. State St., Jacksonville, IL (US) 62650-1847

( * ) Notice: Subject to any disclaimer, the term of this patent is extended or adjusted under 35 U.S.C. 154(b) by 0 days.

(21) Appl. No.: 11/069,209

(22) Filed: Mar. 1, 2005

(65) Prior Publication Data

US 2006/0196610 A1    Sep. 7, 2006

(51) Int. Cl.
*B60C 25/132*    (2006.01)
*B60C 25/04*    (2006.01)
(52) U.S. Cl. ...................... 157/1.17; 157/1.3
(58) Field of Classification Search .............. 157/1.17, 157/1.3, 1.26, 11; D8/31, 88, 89
See application file for complete search history.

(56) References Cited

U.S. PATENT DOCUMENTS

| | | | |
|---|---|---|---|
| 355,754 A | 1/1887 | Beck | |
| 834,908 A | 11/1906 | Hussey | |
| 840,938 A * | 1/1907 | Heller et al. ................. | 157/1.17 |
| 934,461 A * | 9/1909 | Phillips ........................ | 157/1.1 |
| 951,200 A | 3/1910 | Pilliner | |
| 1,100,032 A | 6/1914 | Speck | |
| D57,654 S * | 4/1921 | Hornburg ..................... | D8/31 |
| 1,567,025 A | 12/1925 | Allison | |
| 1,741,801 A | 12/1929 | White | |
| 1,829,804 A | 11/1931 | Loomis | |
| 2,112,661 A | 3/1938 | Abrahams | |
| 2,188,211 A | 1/1940 | Tilson | |
| 2,226,757 A | 12/1940 | Ewell | |
| 2,294,271 A | 8/1942 | Bethard | |
| D134,799 S | 1/1943 | Taylor | |
| 2,311,789 A | 2/1943 | Taylor | |
| D142,931 S | 11/1945 | Bailey | |
| 2,399,146 A | 4/1946 | Schumann | |
| D158,110 S | 4/1950 | Lutz | |
| D158,629 S | 5/1950 | Weynand | |
| 2,518,114 A * | 8/1950 | Barber ...................... | 157/1.17 |
| 2,571,517 A | 10/1951 | Aycock | |
| 2,634,803 A | 4/1953 | Obee | |

(Continued)

OTHER PUBLICATIONS

The Serpent Tire Demounting Tool, Ken-Tool, www.kentool.com/mount_serpenttirechangingsystem.htm, 2001 Ken Tool.

(Continued)

*Primary Examiner*—Hadi Shakeri
(74) *Attorney, Agent, or Firm*—Mark E. Wiemelt; Robert L. Knechtel

(57) ABSTRACT

A tire working tool is presented which comprises a lever arm including a first working end adapted to work a clevis and a second working end adapted to work a second tire bead. The first working end preferably extends generally axially from the lever arm and includes a plurality of indentations catch points for working the clevis. The clevis comprises two freely moving wing members that protrude at a predetermined distance with respect to the sides of the clevis and are adapted to retain a tire bead, a tire bead working member for sliding the tire bead onto the clevis, a wheel fulcrum member that provides an additional leverage point as the tire bead is worked over the wheel rim flange, and an aperture to receive the first working end. The second working end includes a notch member and removable insert for use in working tire rims.

13 Claims, 15 Drawing Sheets

U.S. PATENT DOCUMENTS

| | | |
|---|---|---|
| 2,712,350 A | 7/1955 | Henderson |
| 3,164,197 A | 1/1965 | Bishman et al. |
| 3,584,672 A | 6/1971 | Duquesne |
| 3,771,581 A * | 11/1973 | Johnson .................. 157/1.3 |
| 3,908,728 A | 9/1975 | DeMola |
| D264,043 S | 4/1982 | Edwards |
| 4,436,134 A | 3/1984 | Gaither |
| 4,527,607 A | 7/1985 | Gaither |
| 4,919,184 A | 4/1990 | du Quesne |
| 5,123,470 A | 6/1992 | Tran |
| 5,143,134 A | 9/1992 | Tran |
| 5,213,146 A | 5/1993 | Onozawa |
| 5,265,661 A | 11/1993 | Tran |
| 5,343,921 A | 9/1994 | Kusner |
| 5,363,897 A | 11/1994 | Branch |
| 5,417,270 A | 5/1995 | Brunner |
| 5,740,848 A | 4/1998 | Goracy |
| D395,809 S | 7/1998 | Brown et al. |
| 5,806,578 A | 9/1998 | Gonzaga |
| D412,271 S | 7/1999 | Kliskey |
| 5,971,052 A | 10/1999 | Kliskey |
| 6,179,032 B1 | 1/2001 | Diez |
| 6,182,735 B1 | 2/2001 | du Quesne |
| 6,192,959 B1 | 2/2001 | Spaggiari |
| 6,273,171 B1 | 8/2001 | Kliskey |
| D476,205 S | 6/2003 | Kliskey |
| 6,588,479 B1 | 7/2003 | Kliskey |
| 6,712,114 B2 | 3/2004 | Kliskey |
| 2004/0226660 A1 | 11/2004 | Kliskey |

OTHER PUBLICATIONS

The Serpent Tire Mounting Tool, Ken-Tool, www.kentool.com/mount_serpent.htm, 2001 Ken Tool.

Esco Easy-Way Tubeless Truck Tire Demounting System, www.esco.net/html/cat007.html, US Patent 5,363,897; Nov. 1994.

* cited by examiner

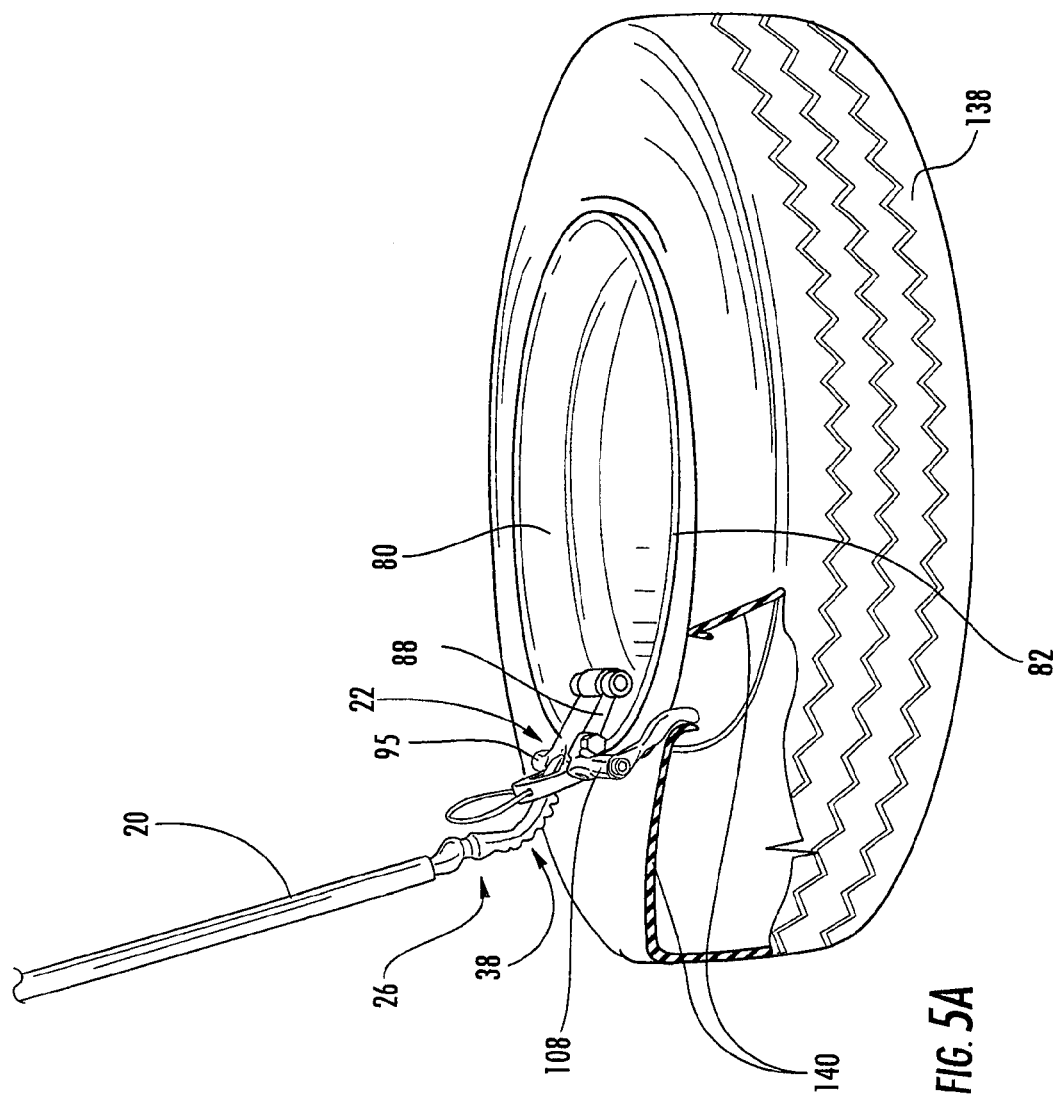

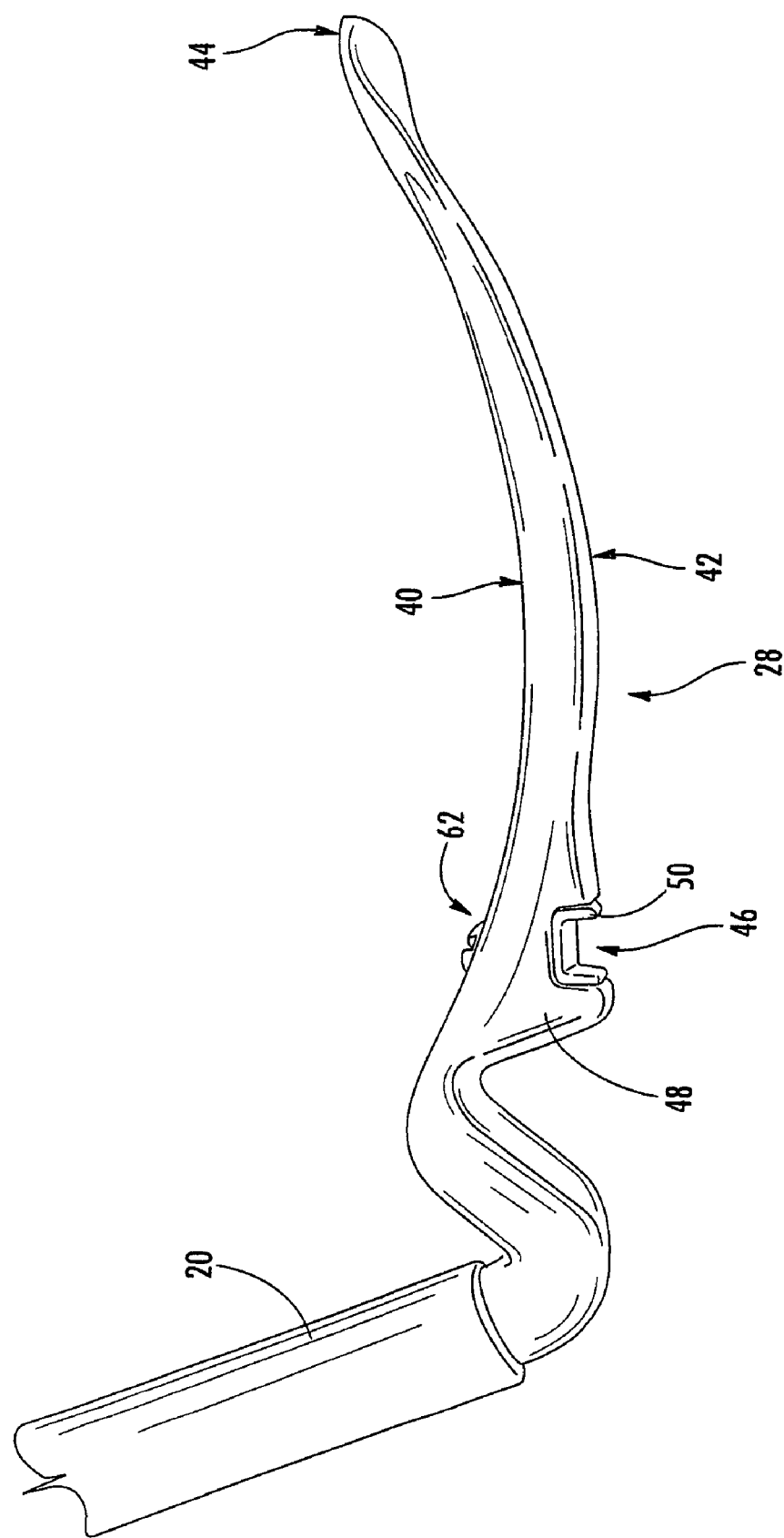

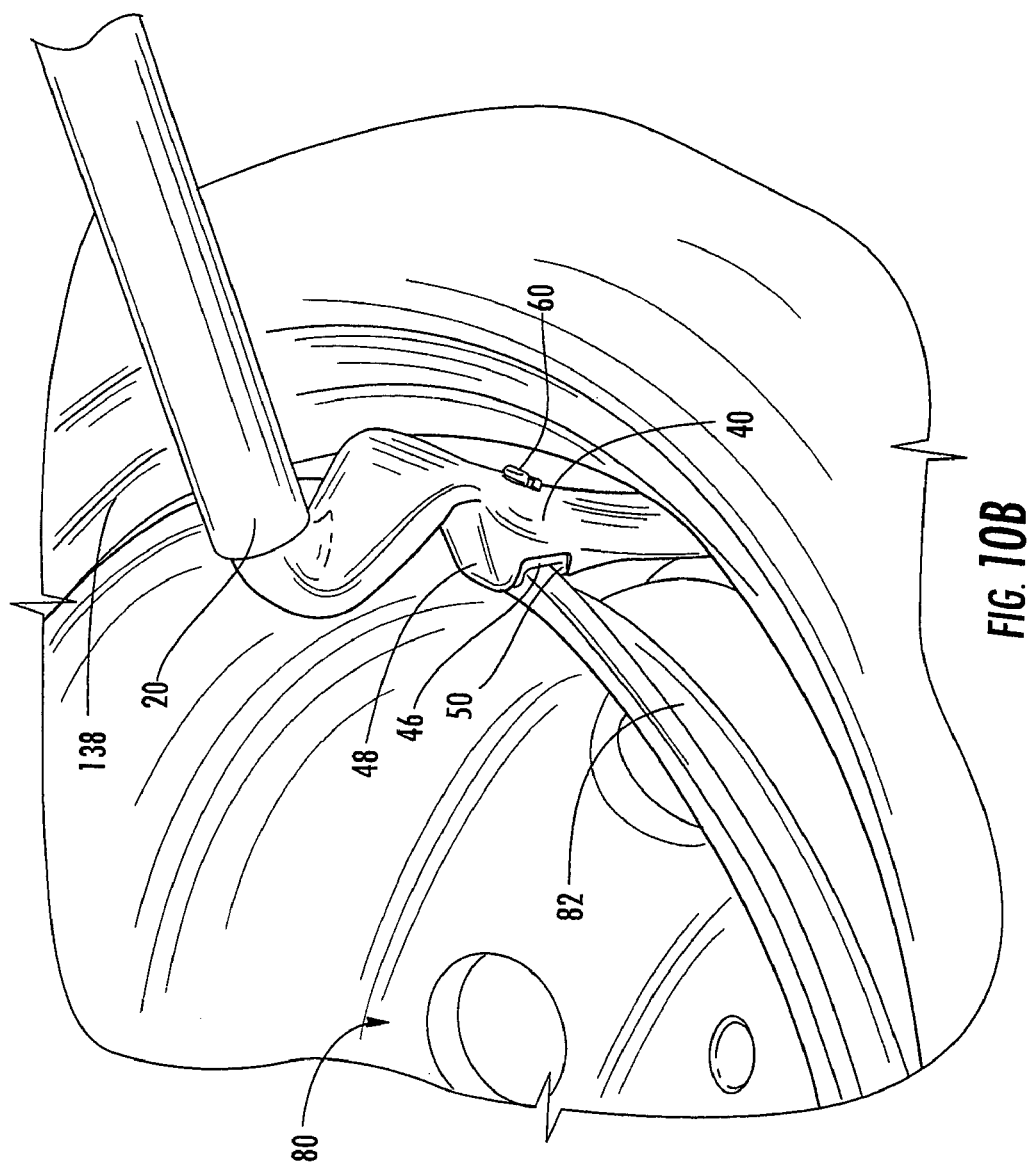

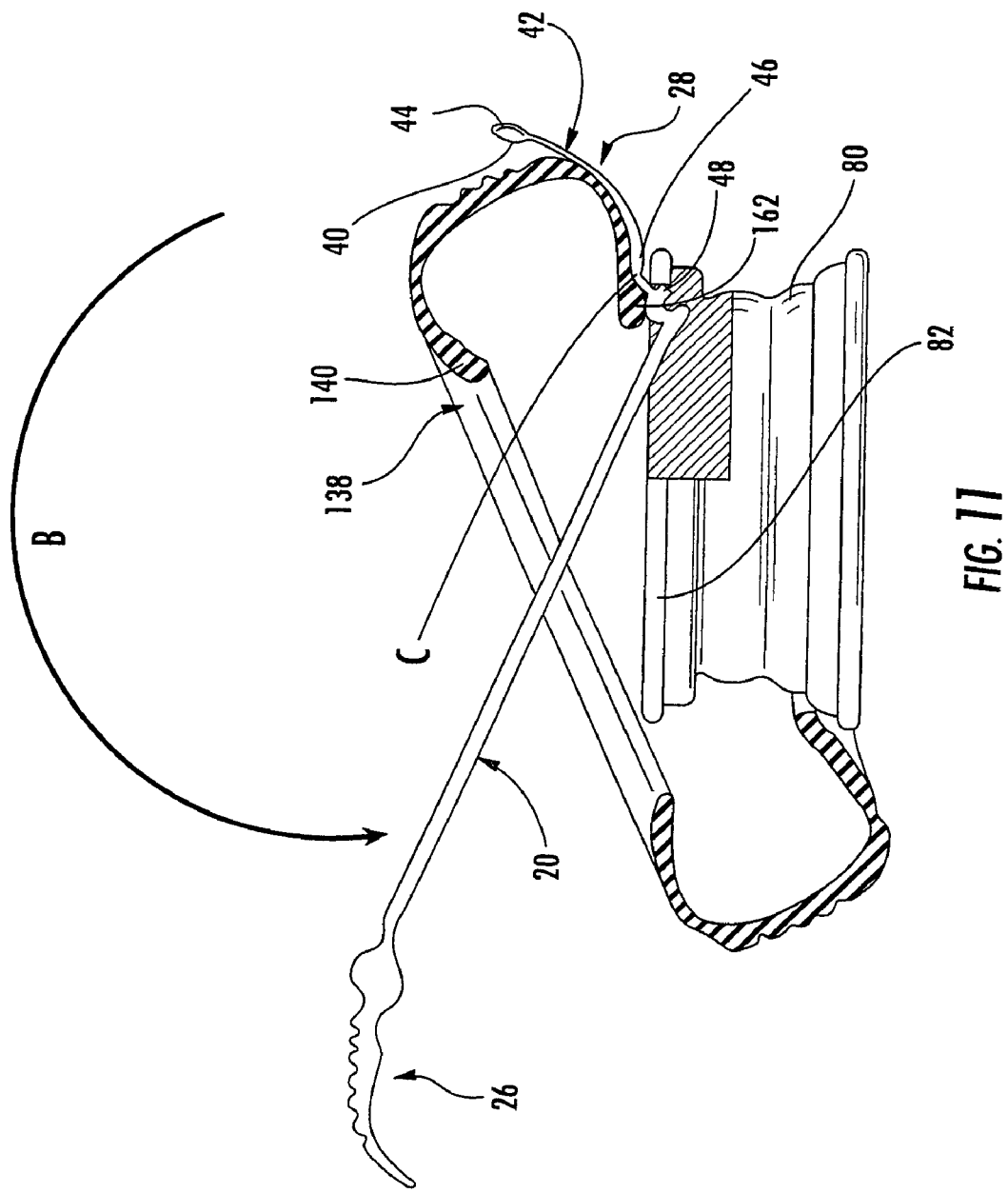

TIRE WORKING TOOL

I. TECHNICAL FIELD OF THE INVENTION

The present invention generally relates to tire working tools and more particularly to an improved tire working tool including a notch member and a clevis that minimize the risk of damage to tire rims and that, further, make the demounting and remounting of a tire onto a wheel easier to accomplish than heretofore known.

II. BACKGROUND OF THE INVENTION AND PRIOR ART

Mounting and demounting tires onto and from a wheel can be a daunting task. The beads of a tire are designed to fit snuggly to the inner side of the flange of a wheel. Stretching the bead a sufficient amount to clear the flange is difficult, particularly when working with larger wheels and tires such as in the case of those for a truck. The task is made all the more difficult when the wheel is made of a soft material that can easily scratch or crack, such as aluminum. Thus, in this case extra care in an already difficult job is mandatory.

There have been many advances proposed in the field to make the job of working a tire easier; these working tools are well known in the art. Generally, these devices consist of a lever arm for gaining leverage, the lever arm having at least one working end configured to receive and work a bead of the tire. Early examples of such devices are seen in U.S. Pat. No. 834,908 to Hussey and U.S. Pat. No. 951,200 to Pilliner, each of which teach a tool for detaching and resetting tires. A more recent example of a typical device is seen in U.S. Pat. No. 6,508,479 to Kliskey. This device teaches a tool for demounting a tire, the tool consisting of a handle and working ends protruding generally perpendicular from the handle, the working ends adapted to work a first tire bead and a second tire bead, respectively.

Further examples of inventive devices is in the field include U.S. Pat. Nos. 1,100,032, 1,567,025, 1,741,801, 1,829,804, 2,112,661, 2,188,211, 2,226,757, 2,294,271, 2,311,789, 2,344,704, 2,399,146, 2,571,517, 2,643,803, 2,712,350, 3,164,197, 3,584,672, 3,908,728, 4,436,134, 4,527,607, 4,919,184, 5,123,470, 5,143,134, 5,213,146, 5,265,661, 5,343,921, 5,363,897, 5,417,270, 5,740,848, 5,806,578, 5,971,052, 6,179,032, 6,182,735, 6,192,959, 6,273,171, 6,712,114, D134,799, D142,931, D158,110, D158,629, D264,043, D335,754, D395,809, D412,271, and D476,205.

A proposed advantage of many of the aforementioned devices is that in addition to offering leverage to mount or demount a tire, they provide a rim or flange catching feature to prevent the device or tire from slipping out of position when the tire is being worked.

A shortcoming of the prior art devices is it that due to the narrow nature of the working end features, the tools do not offer optimum leverage since they do not spread the torque energy of the lever arm beyond the narrow working end. A further shortcoming of the prior art is that they tend to twist about the narrow working ends. This can cause the tool to slip out of position when the tire is being worked, thereby, at best, causing a need for the user to start the process over or, at worst, causing injury to the user. This is particular troublesome when attempting to work the first tire bead.

Past attempts by the inventor to address these shortcomings included the development of a tire working tool consisting of a lever arm with a first working end adapted to accept a clevis, the clevis designed to work the first tire bead over the first flange of a wheel rim. The inventor soon discovered, however, that the design of the clevis was not well suited to the task at hand. The original clevis design was too narrow to provide optimal assistance in working a tire bead. The wings on the clevis neither extended a sufficient distance to prevent the clevis from slipping out of position nor prevented tires from sticking to the wheel rim. Moreover, when working a tire bead, the clevis did not maximize the leveraging energy along the bead of the tire and did not, therefore, reduce the effort required of the user to the degree desired.

Another shortcoming of the prior art, including that of the inventor, is that they do not teach or contemplate the added difficulties in working with soft material wheel rims, such as aluminum.

There is need, therefore, for a tire working tool that minimizes the risk of injury to a user and damage to tire rims and that, further, makes the demounting and remounting of a tire onto a wheel easier to accomplish than heretofore known. The present invention provides such a tool.

III. OBJECTS AND ADVANTAGES OF THE INVENTION

It is an object of the present invention to provide a tire working tool that enables a user to work a tire, particularly that of a larger size, more easily than with prior art tire working tools wherein the tool can be used to either mount or demount a tire.

It is a further object of the present invention to provide a tire working tool that reduces the risk of damage to a wheel while the user is working a tire.

It is yet another object of the present invention to provide a tire working tool that includes a notch member for accurately and securely holding a tire flange such that a tire bead can be worked over the flange with minimal risk of damage to the wheel rim.

It is yet another object of the present invention to provide a tire working tool wherein the notch member provides a housing for a notch insert, the notch insert further being made of a material that provides protection to a wheel rim held within the notch member.

It is yet another object of the present invention to provide a tire working tool wherein the notch insert is reversibly insertable and can be replaced.

It is yet a further object of the present invention to provide a tire working tool that includes a clevis for working a tire of a size and shape which enables superior force displacement and leverage than heretofore known.

It is yet a further object of the present invention to provide a clevis member which, when placed against a wheel rim flange and worked with an adapted working end of the tool, simultaneously engages the tire bead and exerts force to a greater length of the tire bead when leverage is applied to the clevis by the lever arm, thus decreasing the effort necessary to work a tire bead.

It is yet a further object of the present invention to provide a clevis member which minimizes the risk that a tire will stick to a wheel.

It is yet a further object of the present invention to provide a clevis member which minimizes the chance that tire working tool will slip out of position when the clevis is manipulated by the lever arm.

It is yet a further object of the present invention to provide a clevis member which includes a cover for the clevis, the cover further decreasing the risk of damage to a wheel rim.

It is an advantage of the present invention that a user will be better able to work a tire than heretofore possible through the increased functionality of the inventive device.

It is a further advantage of the present invention that there is decrease risk of damage to a wheel rim.

It is a yet another advantage of the present invention that there is, importantly, a decrease risk of injury to a user.

IV. SUMMARY OF THE INVENTION

The above objects and advantages are provided for in the disclosed improved tire working tool. The preferred embodiment of the inventive tire working tool comprises a lever arm having a first working end and a second working end. The first working end adapted to work a clevis during the demounting of a tire and the second working end adapted to work a second tire bead and further including a notch member and insert for use in working tire rims made of softer materials, such as aluminum, and to, further, act as a second catch position for securing a wheel flange as might be necessary when working a tires. Further, the configuration of the first working end enables its use in mounting tires on wheel rims.

The first working end preferably extends generally axially from the lever handle, curving outwardly towards its tip. The top portion of the first working end, convex with respect to the curve, includes a plurality of indentations. The indentations act as catch points for working the clevis.

The clevis comprises a body having a top surface, a bottom surface, two sides, an upper edge, and a lower edge. Located at a predetermined point near the upper edge is an aperture to receive the first working end. Extending generally perpendicularly from the top surface is a wheel fulcrum member, the wheel fulcrum member providing an additional leverage point as the tire bead is worked over the wheel rim flange. Located at the lower edge and extending generally perpendicular from the bottom surface is found a tire bead working member. Attached to the body and extending generally outward from the sides are two freely moving wing members, the wing members extending a predetermined distance with respect to the sides and adapted to retain a tire bead.

When using the tire working tool to work a first tire bead from a wheel rim end, a user places the clevis on the tire wall with the bottom surface towards the tire wall and positions the clevis so that the tire bead working member and wing members are between the wheel rim and tire bead such that the adapted wing members and tire bead working member catch and retain the tire bead.

The first working end is then placed through the aperture, inserting it through the bottom surface and catching one of the first working end indentations onto the wall of the aperture. The user then manipulates the lever arm such that the tire bead is moved up and over the flange of the wheel rim, thus disengaging it from the wheel rim. As the user completes the manipulation, the wheel fulcrum member may be engaged with the outer side of the wheel rim to provide additional leverage, if necessary.

A cover is provided for placement over the wheel fulcrum member, the cover offering additional protection from the scratching of soft materials when the clevis is manipulated by the user.

The second working end is adapted for use in working a second tire bead and is of sufficient length that it can span the width of a wheel rim. The second working end preferably extends generally perpendicular from the lever arm, the second working end having a top side, a bottom side, and a tip. The second working further comprises a notch member located on the bottom side. The notch member is shaped to catch and secure a wheel rim flange. The notch member further being of a size that it can hold and retain a notch insert. They notch insert is preferably made of a material that will not scratch or cause undue added stress to soft materials, such as aluminum. The notch member is used in those situations when the notch is employed and there is need for the notch insert to either provide a snug fit or to protect a wheel rim flange from damage. The notch and notch member are preferably designed such that the notch member is removable and replaceable.

In use, the second working end is inserted between the wheel rim and tire with the bottom side being placed towards the wheel rim. The notch member, which may or may not contain the notch insert, is placed over the wheel flange such that the wheel flange rests within the notch member. The user then manipulates the lever arm so that the second tire bead slides along the top side of the second working end, using the notch member as a fulcrum and the lever arm to provide leverage in working the second tire bead from the wheel rim.

There has been outlined, rather broadly, the more important features of the invention in order that the detailed description thereof that follows may be better understood, and in order that the present contribution to the art may be better appreciated. There are, of course, additional features of the invention that will be described hereinafter and that will form the subject matter of the invention.

As such, those skilled in the art will appreciate that the conception, upon which this disclosure is based, may readily be utilized as a basis for designing of other structures, methods, and systems for carrying out the several purposes of the present invention. It is important, therefore, that the claims be regarded as including such equivalent constructions in so far as they do not depart from the spirit and scope of the present invention.

For a non-limiting example, it is readily apparent that the inventive device could be made in such a way that the first working and second working end are manufactured on separate lever arms.

Further, the purpose of the abstract is to enable the US patent and trademark office and the public generally, and especially the scientists, engineers and practitioners in the art who are not familiar with the patent or legal terms or phraseology, to determine quickly from what cursory inspection the nature and essence of the technical disclosure of the application. The abstract is neither intended to define the invention of the application, which is measured by the claims, nor is it intended to be limiting as to the scope of the present invention in any way.

These together with other objects of the present invention, along with the various features of novelty which characterize the present invention, are pointed out with particularity in the claims annexed to and forming a part of this disclosure. For a better understanding of the present invention, its operating advantages and the specific objects attained by its uses, reference should be had to the accompanying drawings and descriptive matter in which there is illustrated a preferred embodiment of the present invention.

V. BRIEF DESCRIPTION OF THE DRAWINGS

FIG. 5A depicts a partial cut away perspective view of the first working end inserted through the aperture and placed for manipulation of the clevis and further illustrating the wing placement with respect to a tire bead.

FIG. 7 is a side perspective view of the second working end with the notch insert in place.

FIG. 10B further depicts the second working end being placed into position with the notch placed over the wheel flange.

Figure 10A:
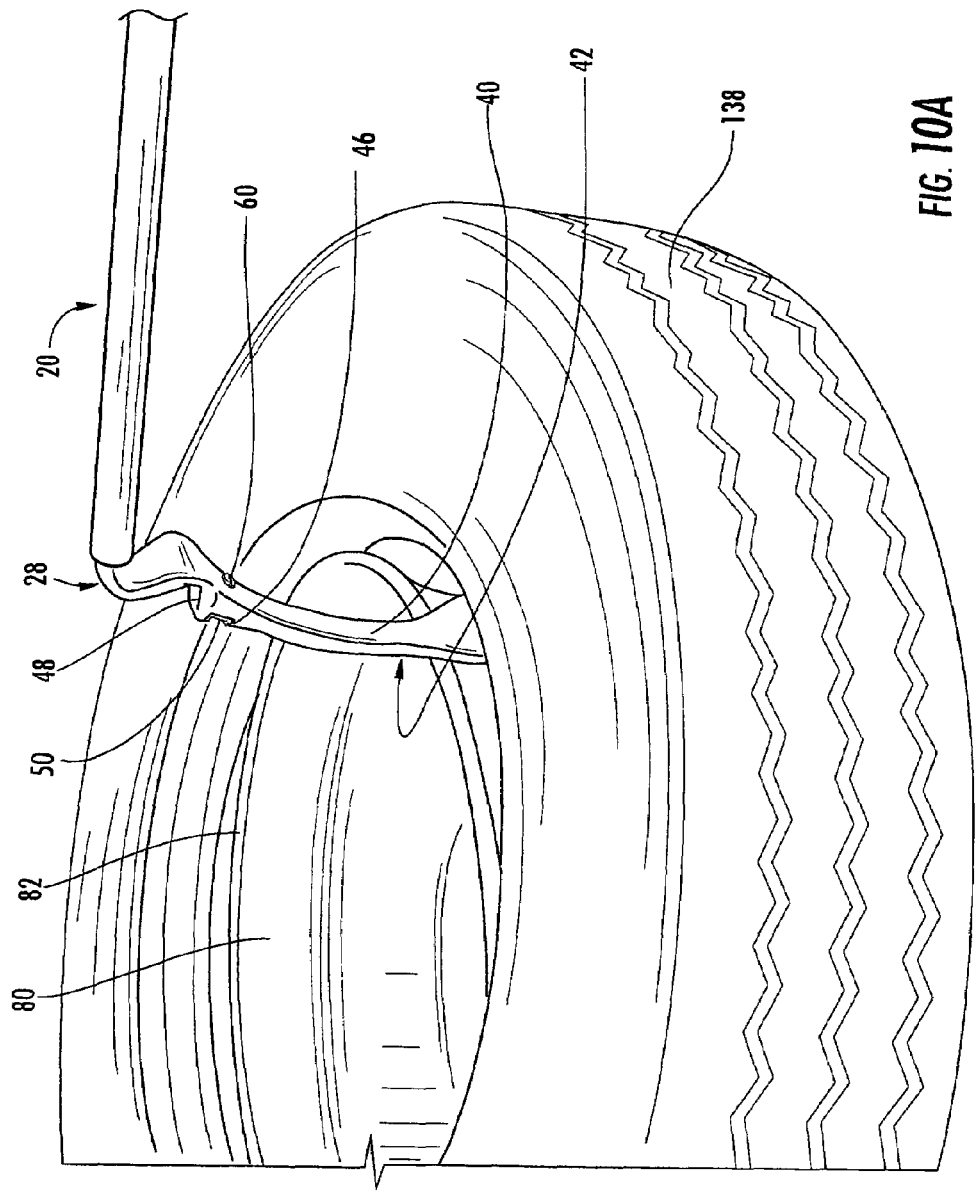
FIG. 10A depicts the second working end being placed into position for use.
Figure 10C:
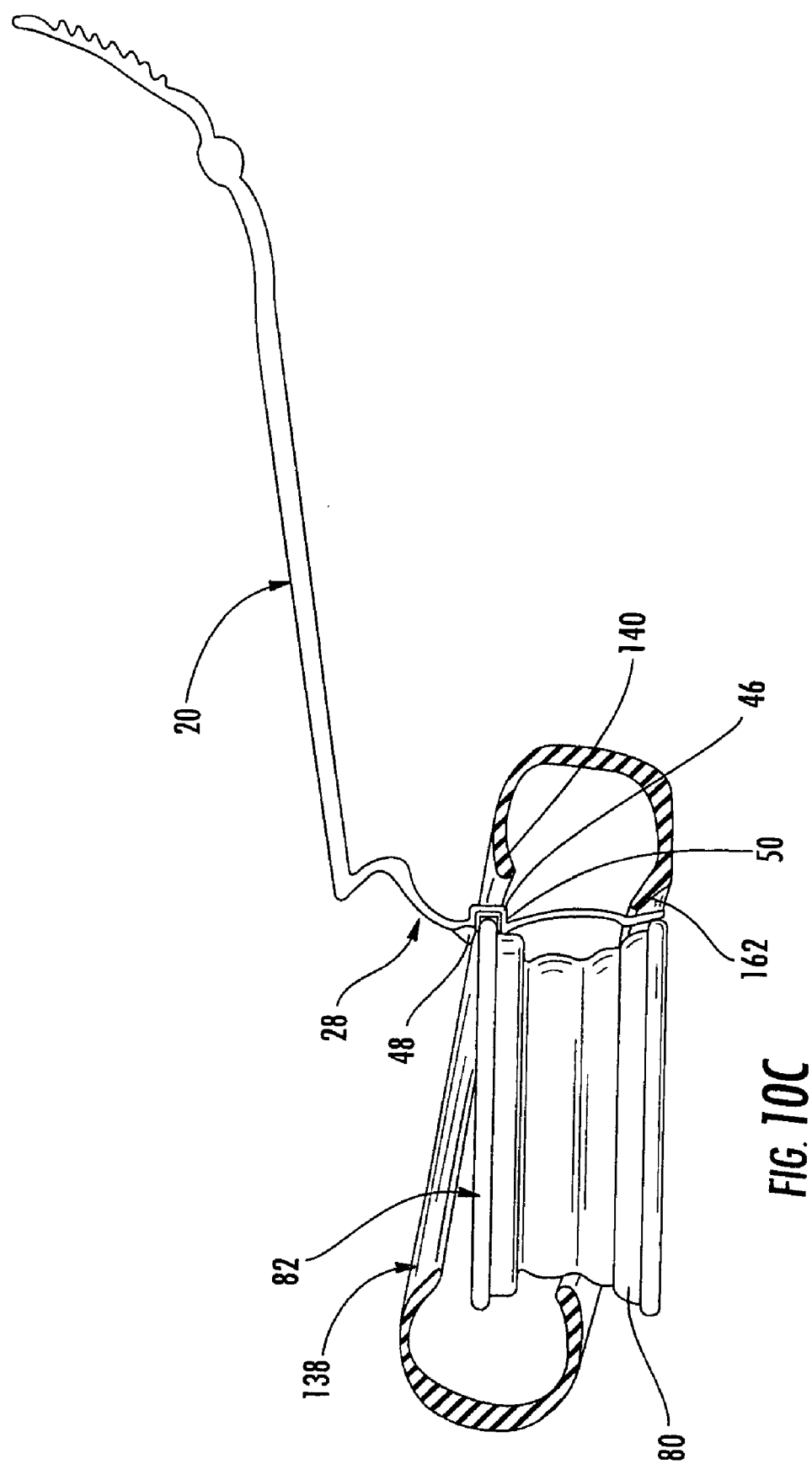

FIG. 10C is a cut away side view illustrating the second working end being placed into position for use.

FIG. 11 is a side, partial cut away view of an example of the second working end in use wherein the notch member is used both as protection against damage to the wheel rim and as a fulcrum point.

VI. DETAILED DESCRIPTION OF THE INVENTION

Before explaining the preferred embodiment of the present invention in detail, it is to be understood that the present invention is not limited in its application to the details of construction and to the arrangements of the components set forth in the following description or illustrated in the drawings. The present invention is capable of other embodiments and of being practiced and carried out in various ways. Also, it is to be understood that the phraseology and terminology employed herein are for the purpose of description and should not be regarded as limiting.

Figure 1:
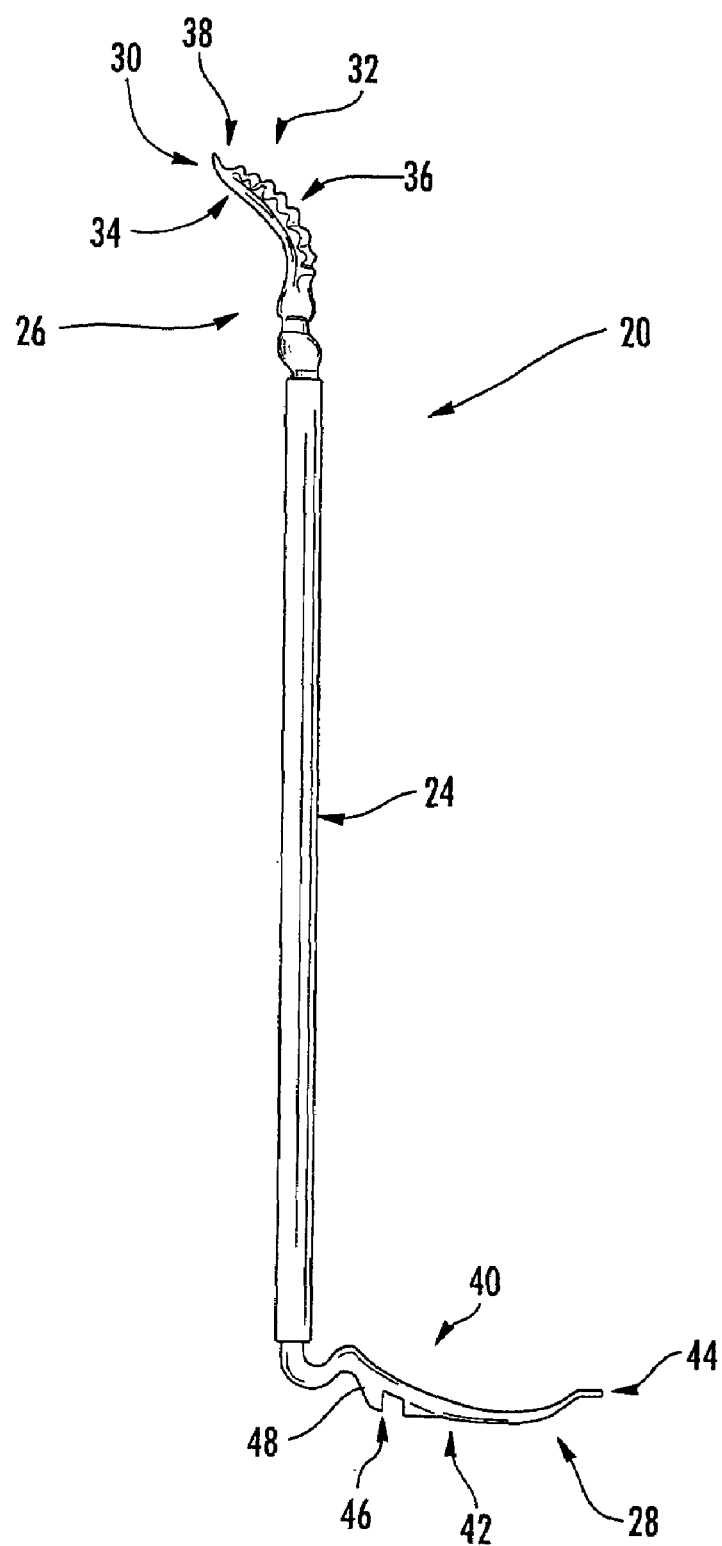
FIG. 1 depicts a side view of the working tool lever arm, first working end, and second working end without the clevis.

Turning to FIG. 1, lever arm 20 is shown. Lever arm 20 includes handle 24, first working end 26, and second working end 28. As shown in FIG. 1, first and second working ends 26, 28 represent opposite ends of a single handle 24. However, it will be readily appreciated that, alternatively, first and second working ends 26, 28 may be incorporated into separate tools, each having its own handle.

Handle 22 in the preferred embodiment is depicted as being of generally circular cross-section and having a substantially straight body midsection. However, the invention is not intended to be so restricted. Alternative handles may be asymmetrical in cross-section or incorporate alternate longitudinal or sectional shapes. Accordingly, as used herein the term "radial" or "radially" shall mean a direction perpendicular to the longitudinal axis of the tool without any intended implication that the tool is necessarily of circular cross-section. Similarly, the terms "axial" or "axially" shall mean a direction generally along the parallel axis of the tool without any intended implication that the tool is straight throughout the length of the handle. Other alternative handles may have geometric irregularities along their respective lengths without departing from the teachings of the invention.

It will also be readily understood by those skilled in the art that lever arm 20 may of any variety of shapes. For purposes of explanation herein, lever arm 20 will, as described above, be depicted and described as an elongate handle 24 having a first working end 26 and a second working end 28 depending from its ends.

As can be seen in FIG. 1, first working end 26 extends generally axially from handle 24. First working 26 begins to curve as it reaches its tip 30, creating a curved portion 32 which, in turn, has a concave side 34 and a convex side 36. Convex side 36 further includes a plurality of indentations 38. Indentations 38 serve as catch points for manipulating clevis 22, as explained more fully below with reference to FIGS. 2, 3, and 5. The preferred embodiment will contain more than one indentation 38 so that a user may select a position that best suits the job at hand and also allows for individual user size and technique. However, a single indentation serving as indentations 38 will functionally enable lever arm 20 to operate within the scope and spirit of the invention.

Likewise, curved portion 32 is not critical to the invention but merely provides additional leverage when manipulating lever arm 20, as explained below with reference to FIG. 5. It will be appreciated by those skilled in the arts that this section of first working end 26 could be straight or angled and still operate within the intended scope and spirit of the invention. The inventor has found, however, that curved portion 32 works best when in an actual curved state.

First working end 26 can also be used to mount a tire by placing concave side 34 towards wheel rim 80 such that tire bead 140 is in any of indentations 38. Handle 22 is then manipulated so that first working end 26 acts as a fulcrum point and tire bead 140, in any of indentations 38, is moved into mounting position over wheel rim flange 82. Of course, it is easy to see that tire bead 140 can be moved to different indentations 80 as is needed to facilitate the mounting of a tire 138.

Second working end 28 is located at the opposite end of handle 24. Second working end 28 can be of any configuration but functions best when, as is often found in the prior art, it extends generally perpendicular from handle 24. As seen in FIG. 7, Second working end 28 has a top side 40, a bottom side 42, and a tip 44. Notch 46 is located in bottom side 42. Notch 46 can be any shape, such a squared off or curved, the shape is not critical. Notch 46 must be of a size that it will accept wheel flange 82 (see FIGS. 4 and 5). The depth and length of notch 46 are not critical so long as it is large enough to accept wheel flange 82 yet not so small that wheel flange 82 will slip out of notch 46 when second working end 28 is being used. It is, however, important to consider the size and depth of notch 46 in relation to the over bulk of second working end 46. Notch 46 must not of so large a size that it weakens second working end 28 and cause lever arm 20 to become useless or injury to a user. As best seen in FIG. 7, it is advisable to place notch 46 at a thick 48 part of second working end 28 to prevent weakening.

Notch 46 serves at least two purposes. First, and turning to FIG. 8, it serves as a housing for notch insert 50. Notch insert 50 is preferably made of a soft material that will not scratch or chip a wheel rim 80 (See FIGS. 4 and 5). The inventor has found that the best materials include rubber and plastic, although any non-scratching material can be used, for example, felt. Use of notch insert 50 is particularly beneficial in situations in which non-steel, soft material wheel rims are used as is seen in the case of an aluminum rim or in the case of painted steel wheel rims. In these circumstances it is a goal of a user to prevent damage to a wheel rim. The prior art makes no allowances for such circumstances and wheel rims have heretofore often been damaged or destroyed during a tire changing procedure. Notch 46 and notch insert 50 in combination provide the means necessary to overcome this problem and minimize the risk of damage to wheel rim 80 by enabling a user to place notch insert 50 into notch 46 and then place notch 46 over wheel flange 82, thus creating a soft, yet sturdy support that minimizes the risk of damage to wheel rim 80 when manipulating lever arm 20 about wheel flange 82 (Manipulation of second working end 28 described more fully below in reference to FIGS. 10 and 11).

Figure 7A:
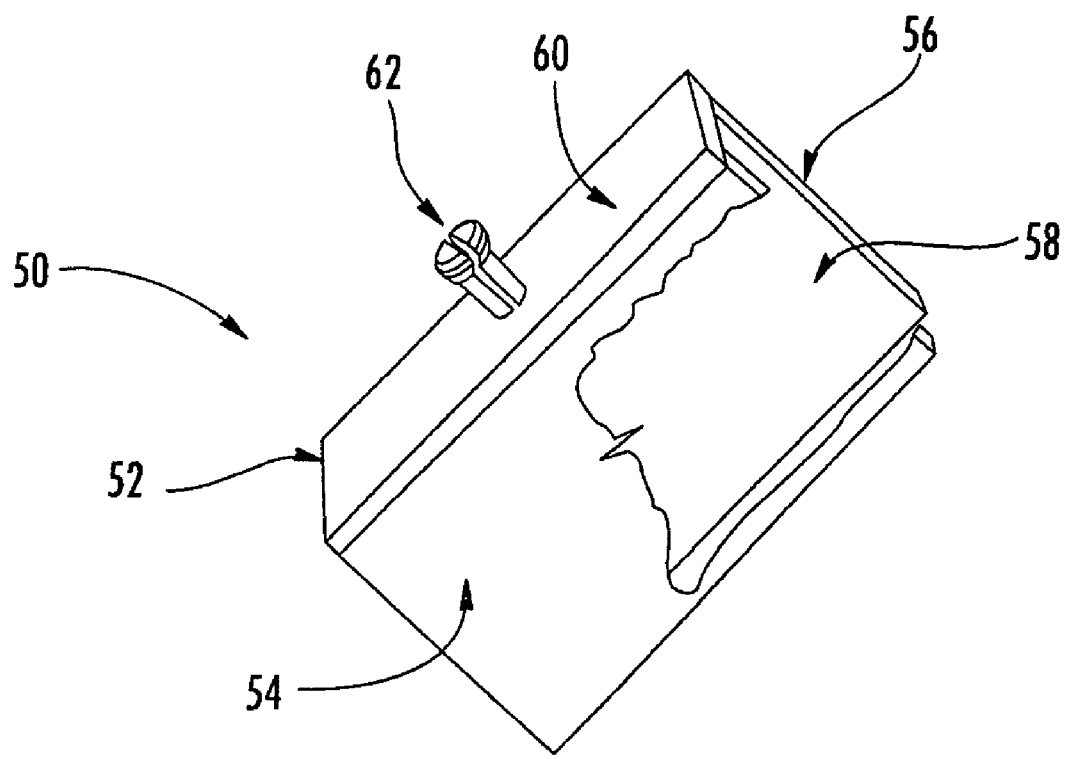
FIG. 7A is a side perspective view of a representative notch insert.
Figure 8:
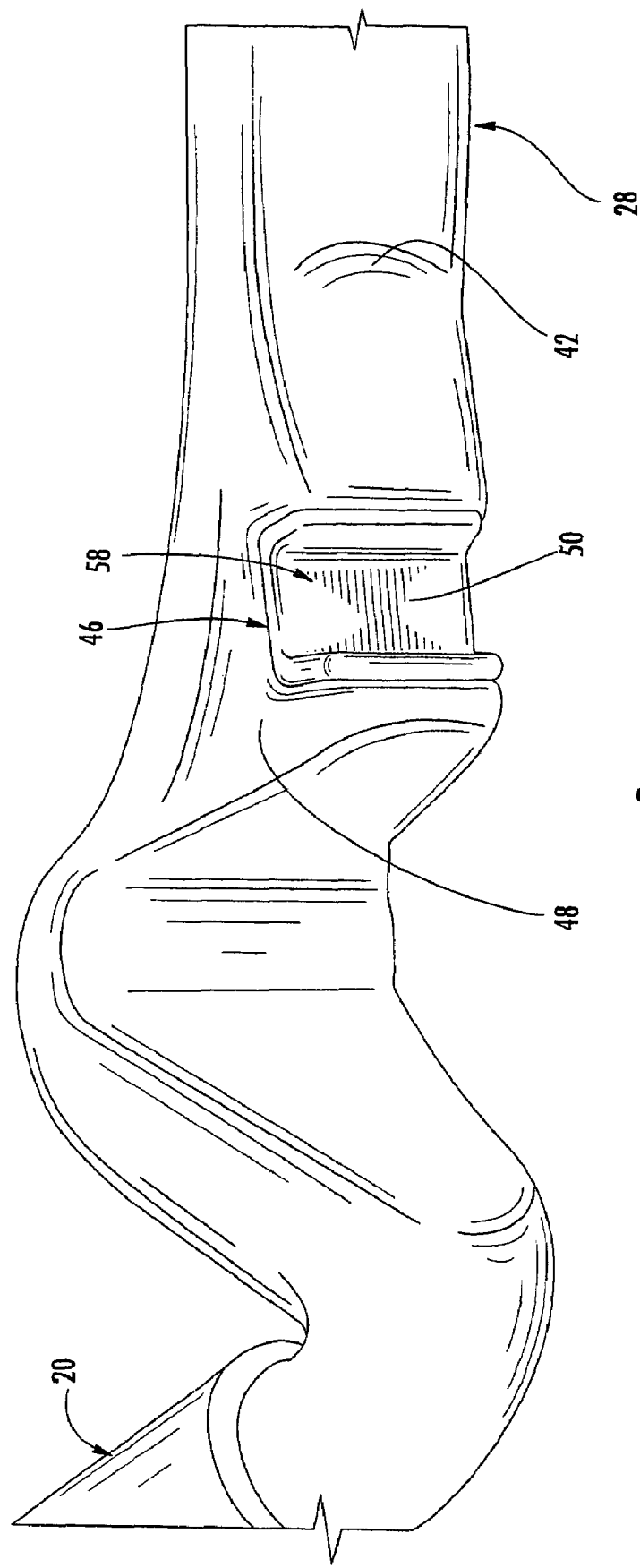
FIG. 8 depicts a perspective bottom view of the second working end with the notch insert.

As seen in FIG. 8, notch insert 50 is reversibly secured into place in notch 46. In the preferred embodiment, and as seen in FIG. 7A, notch insert 50 has a cross piece 52, a first arm 54, and a second arm 56 which create recess 58. Cross piece 52 further has cross piece top 60 which has protruding perpendicularly from it connector 62.

Figure 9:
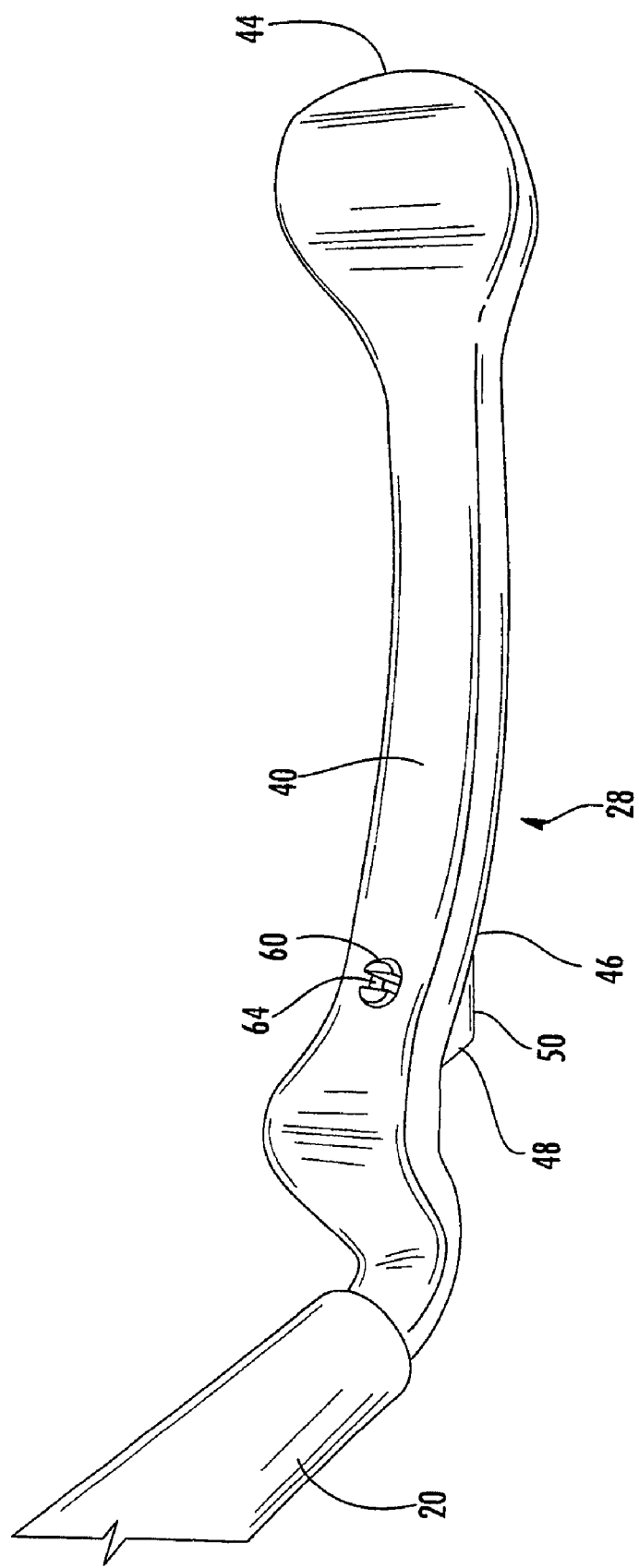
FIG. 9 is a perspective top view of the top side of the second working end illustrating an example of a notch insert attachment.

Notch insert connector 62 is placed into connector receiver 64 to hold notch insert 50 in place (See FIG. 9). Notch insert 50 can be removed from notch 46 for replacement (as may be necessary if it wears out) or in the case that it is necessary to use notch 46 without notch insert 50. While the use of connector 62 is preferred, it is possible that that notch insert 50 can be held in place by any variety of means, such as a compression fitting (although the torque involved in using second working end 28 would likely cause notch insert 50 to move from position) or a two piece member in which notch insert 50 is screwed into place.

The second purpose of notch 46 is as an additional fulcrum point B (FIG. 11) for changing the leverage point when a user manipulate second end 28 (More fully described below with reference to FIGS. 10 and 11).

Figure 2:
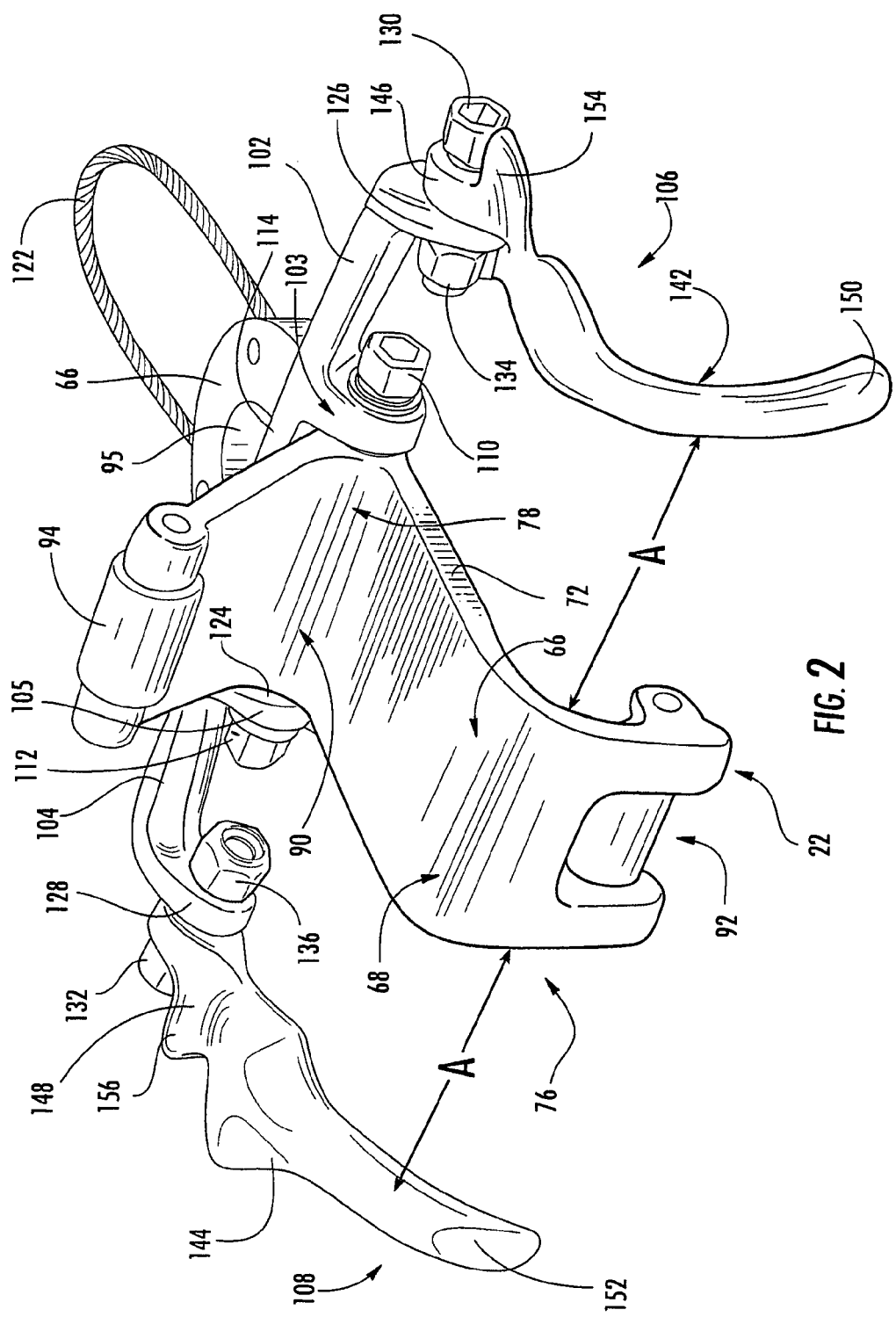
FIG. 2 depicts a perspective view of the clevis from the bottom edge.

Turning to FIG. 2, clevis 22 is shown. Clay this 22 further comprises a body 66 having a top side 68, a bottom side 70 (not shown), a first side 72, a second side 74 (not shown), and upper edge 76, and a lower edge 78. Extending generally perpendicular from upper edge 76 and in the direction of bottom side 70 is found tire bead working member 86. Extending generally perpendicular from the mid point 90 and in the direction of top side 68 is found wheel fulcrum member 88. Tire bead working member 86 is adapted to slide around and retain a tire bead 140 (See FIG. 5A). Tire bead working member 86 further includes a first roller 92 providing smooth movement of tire 138 up and over wheel flange 82 (described more fully below with reference to FIGS. 4, 5 and 5A). Wheel Fulcrum member 88 provides an additional leverage point for working a tire 138 over a wheel flange 82 (described more fully below with reference to FIGS. 4, 5 and 5A). Wheel fulcrum member 88 also includes a second roller 94 for providing a vehicle for clevis 22 to move smoothly on the inner surface 96 of wheel rim 80 (described more fully below with reference to FIGS. 4, 5 and 5A).

Body 66 further includes aperture 95 near lower edge 78. First working end 28 of lever arm 20 is inserted through aperture 95 and used to manipulate clevis 22 (described more fully below with reference to FIGS. 4, 5 and 5A).

Affixed adjacent to first side 72 and second side 74 are freely moving first wing member 98 and freely moving second wing member 100, respectively. First wing member 98 and second wing member 100 are mirror images of one another and the following explanation refers to both even though reference may be made to a single wing member. Wing members 98 and 100 further comprise separator bars 102, 104 and wings 106, 108. Separator bars 102, 104 are rotatably affixed to body 66 at body attachment point 103, 105 via any acceptable method. In the preferred embodiment they are affixed using a threaded screw (not shown) that is integral to body 66 and secured with nut 110, 112. Separator bars 102, 104 create a space A, A' between body 66 and wings 106, 106 that enables wings 106, 108 to be a sufficient distance from body 66 that they increase the area of tire 138 that can be worked on at a given time.

Figure 3:
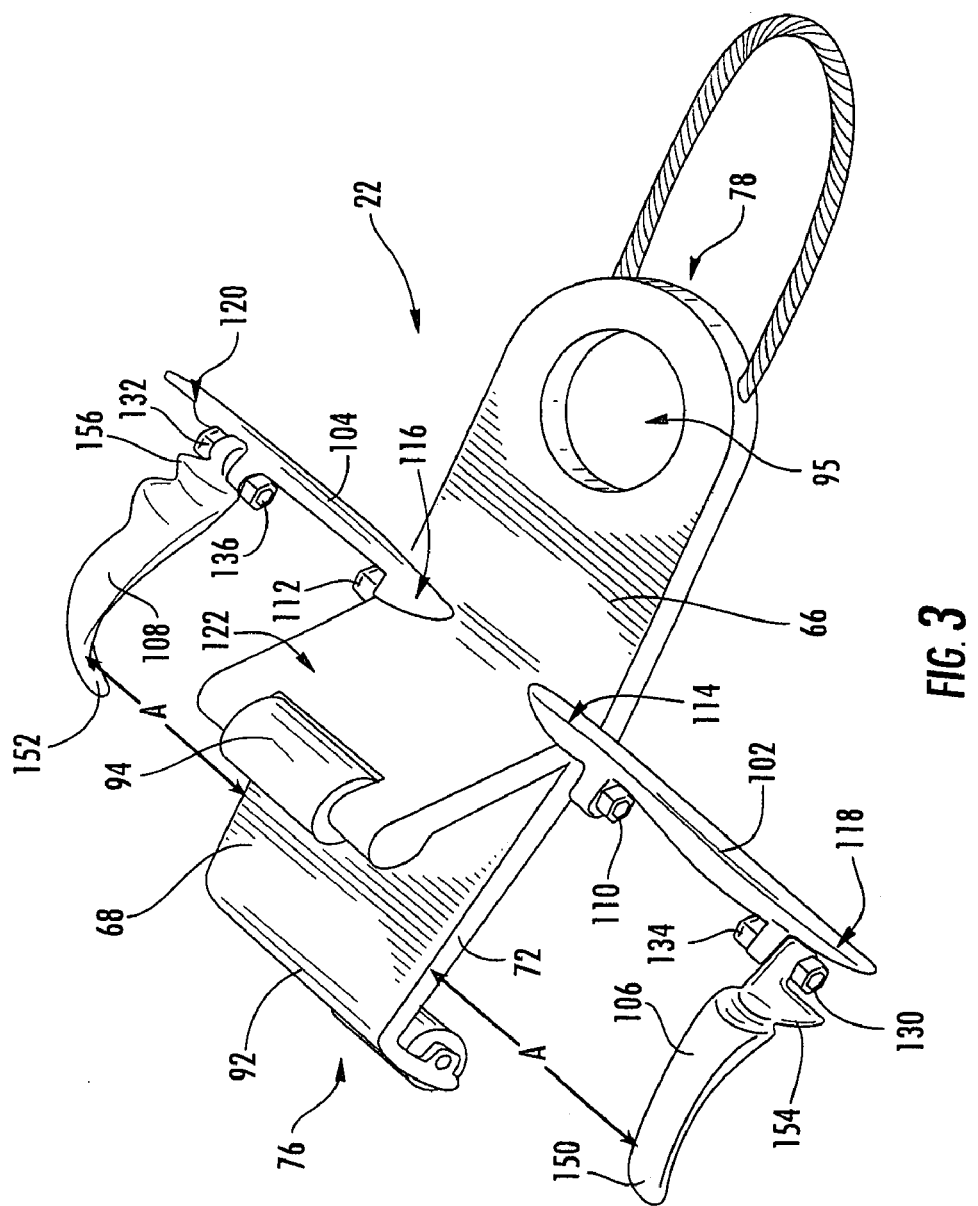
FIG. 3 depicts a view of the clevis illustrating the aperture.

Turning to FIG. 3, it is seen that separator bars 102, 104 include inner catch 114, 116 and outer catch 118, 120. Inner catch 114, 116 extends over the top side 40 of body 66 on the back side 122 of wheel fulcrum member 88. Inner catch 114, 116 prevent separator bar 102, 104 from rotating about attachment point 103, 105. Outer catch 118, 120 work in a similar manner to prevent wing 106, 108 from rotating about wing attachment point 126, 128.

Wing 106, 108 are rotatably affixed to separator bar 102, 104 at wing attachment point 126, 128 through any acceptable method. In the preferred embodiment they are affixed using a threaded screw 130, 132 and secured with nut 134,136. Wing 106, 108 have a wing body 142, 144, wing head 146, 148, and wing foot 150, 152. Wing head 146, 148 being adapted to rotatably affix to separator bar 102, 104 and further including wing catch 154, 156. Wing catch 154, 156 engages separator bar outer catch 118, 120 to prevent wing 106, 108 from rotating about wing attachment point 126, 128 when clevis 22 is manipulated.

Wing body 142, 144 is curved in a downward direction from the wing head 146, 148 to the wing foot 150, 152. The downward curve enables wing 106, 108 to engage tire bead 140 and hold it as tire bead 140 is moved over wheel flange 82.

Figure 4:
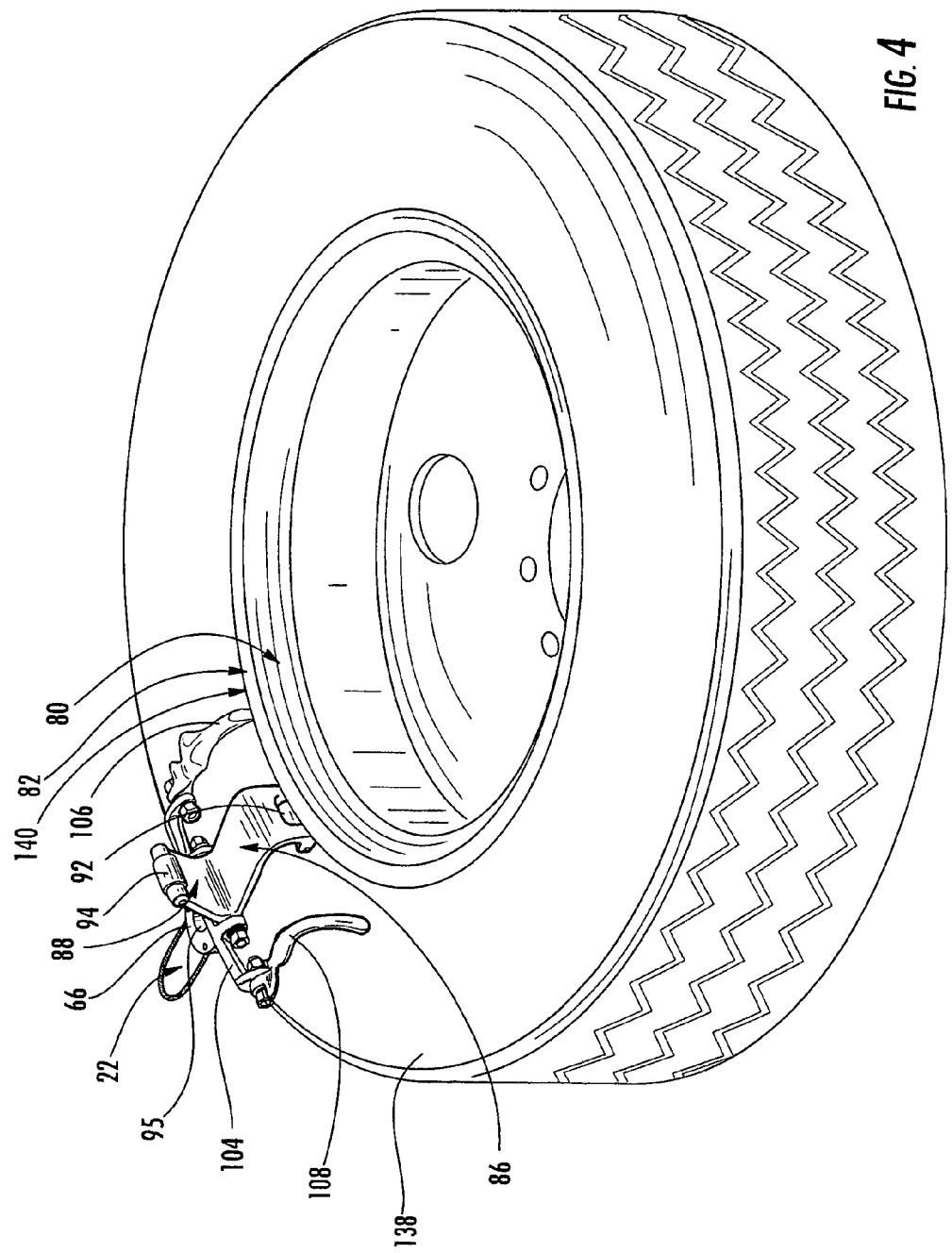
FIG. 4 is a perspective view of an example of the clevis being placed into position for use.

Turning to FIG. 4, to use the inventive device to demount a tire 138 from a wheel rim 80, a user places clevis 22 with tire bead working member 86 and wings 106, 108 facing wheel rim 80. As seen in FIG. 5, clevis 22 is set into place by positioning tire bead working member 86 and wings 106, 108 between tire bead 140 and wheel rim 80 near wheel flange 82 with wheel fulcrum member 88 above wheel flange 82 and extending over wheel rim 80. As seen in cut away view FIG. 5A, wing 106, 108 and tire bead working member 86 (not seen) are positioned below tire bead 140 and retaining it in place due to the curve of wing 106, 108 and downward disposition of tire bead working member 86.

Figure 6:
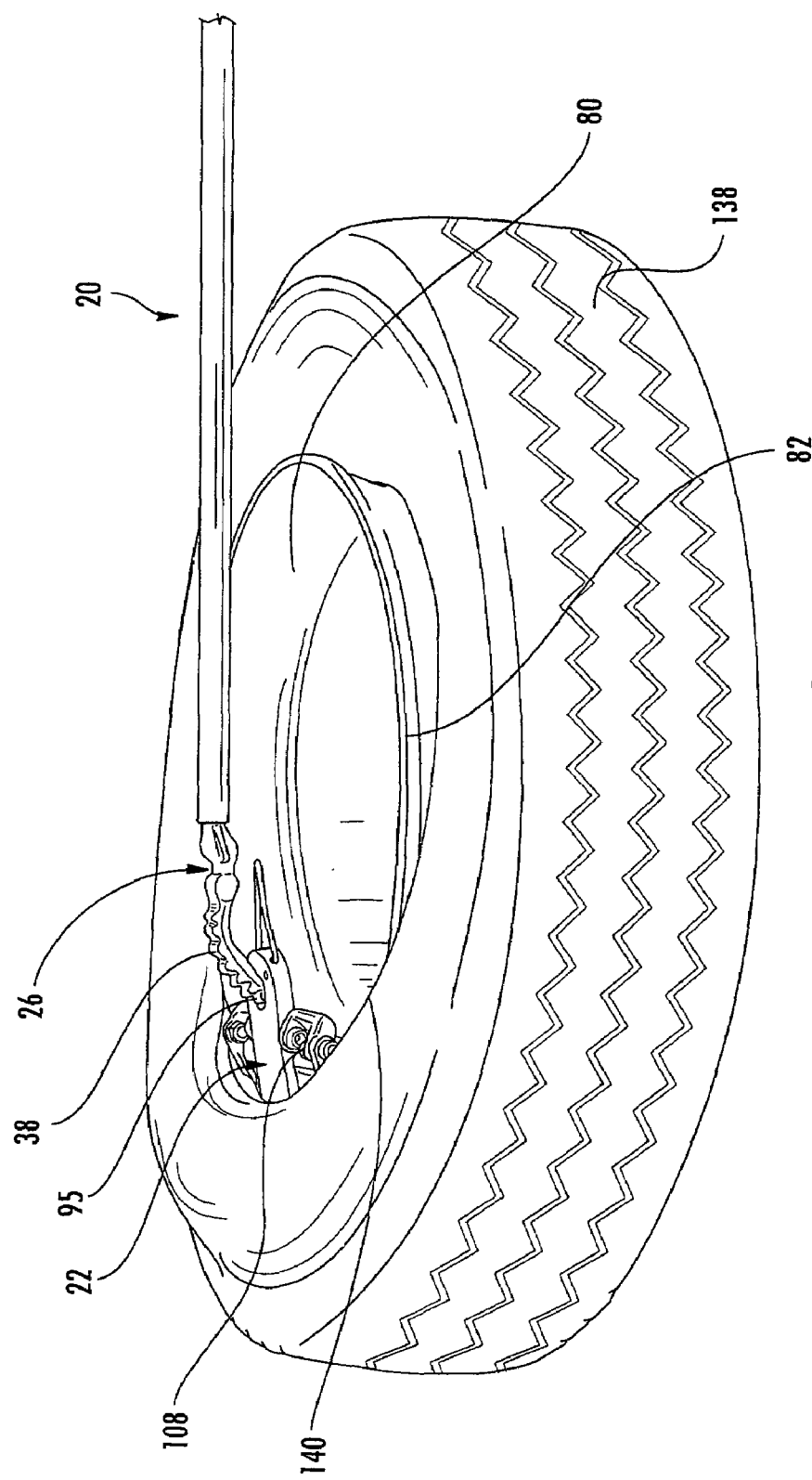
FIG. 6 depicts the lever arm in a working position with the clevis working the tire bead.

First working end 26 of lever arm 20 is placed into and partial through aperture 95 with the user selecting an appropriate indentation 38 to secure first working end 26 into place in aperture 95. The user then manipulates lever arm 20 such that it is moved over tire 138 and wheel rim 80, as depicted in FIG. 6. As lever arm 20 is rotated over tire 138, wheel fulcrum member 88 comes into contact with wheel rim 80 and provides additional leverage to pull tire bead 140 over wheel flange 82. As tire bead 140 moves over wheel flange 82, tire bead working member roller 92 moves along the inside of tire 138 (not shown).

Figure 5:
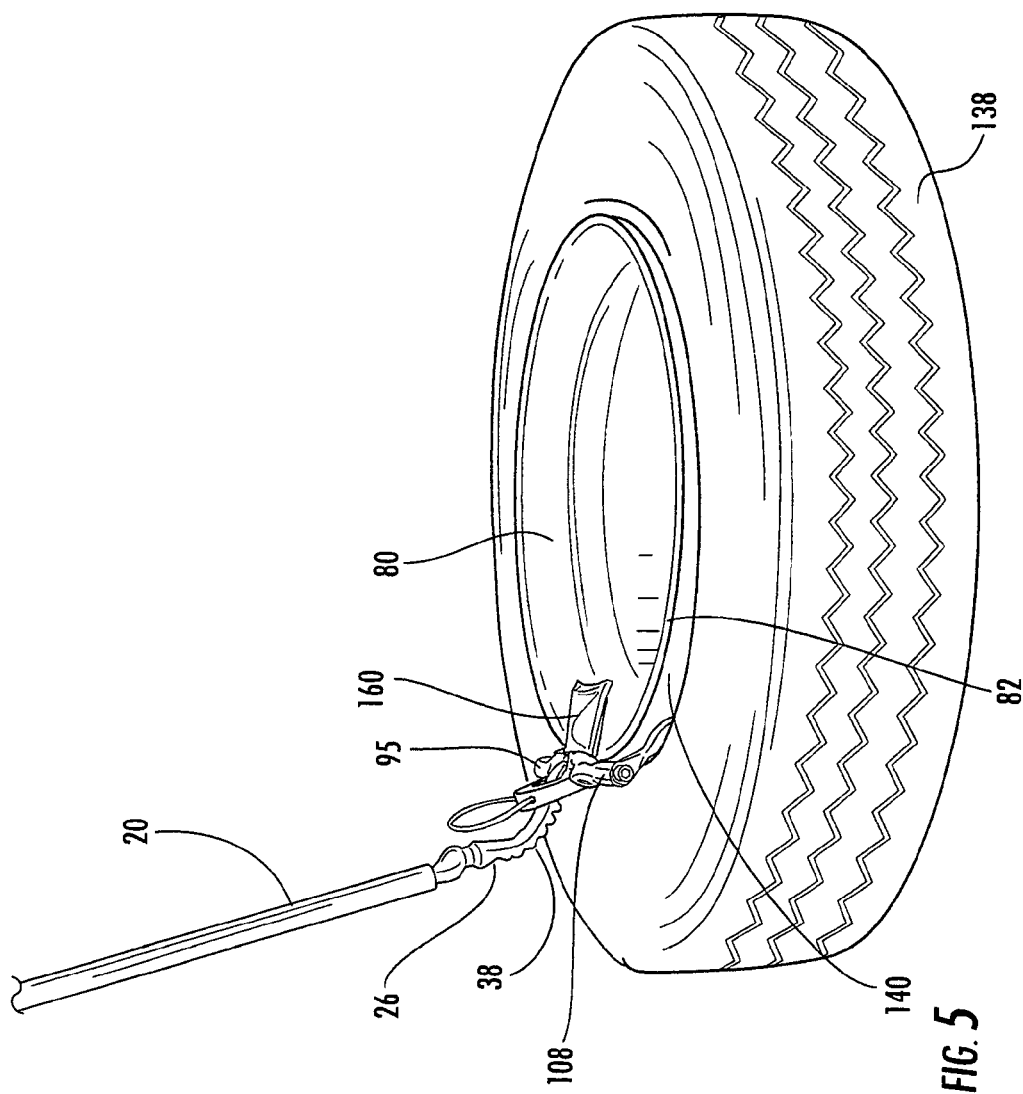
FIG. 5 depicts a perspective view of the first working end inserted through the aperture and placed for manipulation of the clevis and, further, illustrating the cover placed over the wheel fulcrum member.

As depicted in FIG. 5, cover 160 may be placed over wheel fulcrum member 88 to decrease the risk that roller 94 scratches wheel rim 80.

Once tire bead 140 is completely removed from under wheel flange 82, the user then uses second working end 28 to remove second tire bead 162 from wheel rim 80 and thereby separating tire 130 completely from wheel rim 80.

As seen in FIG. 10A, the user inserts second working end 28 between tire 138 and wheel rim 80 with second working end bottom side 42 towards wheel rim 80. As seen in FIG. 10B, second working end 28 is positioned such that notch 46 is over and receives wheel flange 82 with notch insert 0 optionally used to protect wheel rim 80 from damage. As depicted in cut away view FIG. 10C, second working end 28 spans the entire width of tire 138.

Once second working end 28 is in position, the user rotates lever arm in an arc B, and using notch 46 as a fulcrum C to facilitate the removal of tire 138.

It is to be understood, however, that even though numerous characteristics and advantages of the preferred and alternative embodiments have been set forth in the foregoing description, together with details of the structure and function of the embodiments, the disclosure is illustrative only, and changes may be made in detail, especially in matters of shape, size and arrangement of parts within the principles of the invention to the full extent indicated by the broad general meaning of the terms in which the appended claims are expressed.

I claim:

1. A tire working tool comprising:
    a lever arm having a handle, a first working end and a second working end;
    the first working end adapted to work a clevis;
    the second working end having a top side, bottom side, and a tip and further comprising a notch in the bottom side; and,
    a clevis further comprising a body portion having a top surface, a bottom surface and two sides, the body portion further comprising a wheel fulcrum member extending outward from the top surface, a tire working member extending outward from the bottom surface, two wing members rotatably attached to the body portion and extending outward from the body from the two sides at a predetermined distance from the sides, and an aperture for receiving the first working end.

2. The tire working tool of claim 1 wherein the first working end extends generally axially from the handle, curving off a parallel plane near its tip creating a concave side and a convex side, the convex side further including at least one indentation.

3. The tire working tool of claim 1 further comprising a notch insert sized to fit in the notch and adapted to receive a wheel flange.

4. The notch insert of claim 3 being made of a material that will decrease damage to a tire rim.

5. The notch insert material of claim 4 being selected from the group of plastic or rubber.

6. The tire working tool of claim 1 further comprising a cover adapted to fit over the wheel fulcrum member.

7. The tire working tool of claim 1 wherein the wheel fulcrum member further includes means for facilitating the movement of the wheel fulcrum member.

8. The tire working tool of claim 7 wherein the means for facilitating the movement of the wheel fulcrum member is a roller.

9. The tire working tool of claim 1 wherein the tire working member further includes means for facilitating the movement of the tire working member.

10. The tire working tool of claim 9 wherein the means for facilitating the movement of the tire working member is a roller.

11. A tire working tool comprising:
    a lever arm having a working end adapted to work a clevis, the working end extends generally axially from a handle, curving off a parallel plane near its tip creating a concave side and a convex side, the convex side further including at least one indentation; and,
    a clevis further comprising a body portion having a top surface, a bottom surface and two sides, the body portion further comprising a wheel fulcrum member extending outward from the top surface, a tire working member extending outward from the bottom surface, two wing members rotatably attached to the body portion and extending outward from the body from the two sides at a predetermined distance from the sides, and an aperture for receiving the working end.

12. A tire working tool comprising:
    a lever arm having a working end adapted to work a clevis, the working end extends generally axially from a body portion, curving off a parallel plane near its tip creating a concave side and a convex side, the convex side further including at least one indentation; and,
    clevis further comprising a body portion having a top surface, a bottom surface and two sides, the body portion further comprising two wing members rotatably attached to the body portion and extending outward from the body from the two sides at a predetermined distance from the sides, and an aperture for receiving the working end.

13. A method for working a tire from a wheel rim comprising the steps of:
    placing a clevis against a tire between a first tire bead and a first wheel rim flange, the clevis including at least a body portion having a bottom surface, a top surface and two sides, two wing members rotatably attached to the body portion and extending outward at a predetermined distance from the sides and adapted to receive and retain the tire bead, and an aperture for receiving a working end of a lever arm;
    inserting the working end of the lever arm through the aperture;
    manipulating the lever arm in a direction such that the clevis stretches the first tire bead over the wheel rim;
    inserting a second working end having a top side, and tip and a notch in the bottom side between the tire and the wheel rim such that the first wheel rim flange is placed in the notch; and, manipulating the lever arm such that the tire slides along the second working end with the notch performing as a fulcrum.

* * * * *